United States Patent
Chen

(10) Patent No.: US 8,909,952 B2
(45) Date of Patent: Dec. 9, 2014

(54) POWER SUPPLY APPARATUS OF COMPUTER SYSTEM AND METHOD FOR CONTROLLING POWER SEQUENCE THEREOF

(75) Inventor: Chia-Hsiang Chen, Taipei (TW)

(73) Assignee: Inventec Corporation, Taipei (TW)

( * ) Notice: Subject to any disclaimer, the term of this patent is extended or adjusted under 35 U.S.C. 154(b) by 601 days.

(21) Appl. No.: 13/333,672

(22) Filed: Dec. 21, 2011

(65) Prior Publication Data

US 2013/0132741 A1   May 23, 2013

(30) Foreign Application Priority Data

Nov. 18, 2011   (TW) .............................. 100142258 A

(51) Int. Cl.
  *G06F 1/26* (2006.01)
  *G06F 1/30* (2006.01)
(52) U.S. Cl.
  CPC ...................................... *G06F 1/26* (2013.01)
  USPC ......................................... 713/300; 713/330
(58) Field of Classification Search
  None
  See application file for complete search history.

(56) References Cited

U.S. PATENT DOCUMENTS

| | | | |
|---|---|---|---|
| 2002/0087906 A1* | 7/2002 | Mar et al. ....................... | 713/330 |
| 2007/0079162 A1* | 4/2007 | Mundada et al. ............. | 713/330 |
| 2008/0126814 A1* | 5/2008 | Burkland et al. ............. | 713/300 |

FOREIGN PATENT DOCUMENTS

| TW | I319136 | 1/2010 |
|---|---|---|
| TW | I325535 | 6/2010 |

* cited by examiner

*Primary Examiner* — Kim Huynh
*Assistant Examiner* — Vincent Chang
(74) *Attorney, Agent, or Firm* — CKC & Partners Co., Ltd.

(57) ABSTRACT

A power supply apparatus of a computer system and a method for controlling a power sequence thereof are provided. The power supply apparatus includes a power sequence module, a voltage supply unit, and a state recording module. The power sequence module provides voltage enable signals in turn according to first power-good signals. The voltage supply unit provides power voltages in turn according to the voltage enable signals and returns second power-good signals. Components in the computer system also provide third power-good signals when the components receive the power voltages. When one of the third power-good signals is converted from enabled to disabled, the state recording module delays a tolerance period according to the component corresponding to the third power-good signal, and converts the first power-good signal corresponding to the third power-good signal from enabled to disabled after the tolerance period is delayed.

13 Claims, 5 Drawing Sheets

POWER SUPPLY APPARATUS OF COMPUTER SYSTEM AND METHOD FOR CONTROLLING POWER SEQUENCE THEREOF

CROSS-REFERENCE TO RELATED APPLICATION

This application claims the priority benefit of Taiwan application serial no. 100142258, filed Nov. 18, 2011. The entirety of the above-mentioned patent application is hereby incorporated by reference herein and made a part of this specification.

BACKGROUND OF THE INVENTION

1. Field of the Invention

The present invention generally relates to a power supply technology, in particular, to a power supply apparatus of a computer system and a method for controlling a power sequence thereof.

2. Description of Related Art

At present, the start-up process of a computer system is a very important link for a computer itself, and the computer system mentioned here is a computer system such as a notebook computer, a server, or a personal computer. No matter how perfect and strong the function design and calculation function of the computer system are, as long as the power sequence in the start-up process cannot be judged or processed perfectly, the computer system is unstable in operation and the occurrence probability of system shut-down without warning, restart-up, or even system damage is greatly increased.

Various components of the computer system require different voltage levels due to the difference in semiconductor processes and apparatuses, for example, a central processing unit (CPU), a chipset, and a dynamic random access memory (DRAM) have their respective required voltage levels. Therefore, power supply apparatuses of computer systems at present are all designed with power sequence control modules, and the power sequence control module is referred to as a power sequence state machine in some embodiments.

When a user presses a power button on the computer system to start it up, the control module starts power voltages successively, and only when the power voltage is stable and a component receiving the power voltage also operates normally, continues to start a power voltage of a lower level. Therefore, the control module starts all power voltages in turn (for example, in the order from high voltage to low voltage) until all the components in the computer system operate normally, so that the computer system enters from a start-up mode to a run-time mode and begins to start an operating system. In the run-time mode, the control module continuously monitors whether the components operate normally. As long as one of the components emits a power error signal, the existing control module usually performs a protection action such as forced shut-down or restart-up on the computer system immediately, so that the computer system is not damaged.

In this way, some components may immediately emit a power error signal due to transiently unstable voltage, even if the components return to normal right away later, and at this time, the computer system will be shut down or restarted up forcibly, so that the user's use of the computer system to access data is forcibly interrupted and the information being processed may be lost or damaged, even shortening the life cycle of the computer system.

The conventional solution is to add a de-bounce module constituted by a flip-flop at endpoints of the components where power error signals may be emitted, so as to eliminate the occurrence of transient power error signals. However, the de-bounce module only can eliminate signal change in a very short time, and when the duration of the power error signals emitted continuously exceeds the range that can be eliminated by the de-bounce module, the above deficiency still exists. In addition, the de-bounce module cannot set transient power errors for different components.

However, not every component has significant influence on the computer system after a transient power error occurs. In the currently used power supply technology, if the component in which an error occurs is a peripheral not affecting the entire operation of the system, the computer system is still shut down forcibly, thus incurring unnecessary loss to the user. Therefore, how to provide the computer system with a desirable power sequence control technology is a major problem to be solved for the computer system in the power supply technology.

SUMMARY OF THE INVENTION

Accordingly, the present invention is directed to a power supply apparatus of a computer system and a method for controlling a power sequence thereof, capable of tolerating self-recovery of a specific component after a transient power error occurs, so as to reduce the occurrence probability that the computer system takes a forced protection measure (for example, forced shut-down, restart-up, or system locking).

The present invention provides a power supply apparatus of a computer system. The power supply apparatus includes a power sequence module, a voltage supply unit, and a state recording module. The power sequence module provides a plurality of voltage enable signals in turn according to a plurality of first power-good signals. The voltage supply unit provides a plurality of corresponding power voltages in turn according to the voltage enable signals, and returns a plurality of second power-good signals when the power voltages are output stably. Moreover, a plurality of components in the computer system provides a plurality of third power-good signals after the components receive the corresponding power voltages and are started successfully, and each component corresponds to each third power-good signal.

The state recording module coupled to the power sequence module and the voltage supply unit temporarily stores the voltage enable signals, the second power-good signals, and the third power-good signals, so as to provide the first power-good signals according to the second power-good signals and the third power-good signals. When one of the third power-good signals (for example, a specific third power-good signal) is converted from enabled to disabled, the state recording module judges a tolerance period according to the component corresponding to the specific third power-good signal, and converts one of the first power-good signals corresponding to the specific third power-good signal from enabled to disabled after the tolerance period is delayed.

In an embodiment of the present invention, when the state recording module detects in the tolerance period that the specific third power-good signal is converted from disabled to enabled again, the state recording module does not convert the state of one of the first power-good signals corresponding to the specific third power-good signal and continues maintaining the signal as enabled.

In an embodiment of the present invention, the state recording module includes a voltage enable register, a voltage power-good register, a component power-good register, and a judgment unit. The voltage enable register temporarily stores the voltage enable signals as a plurality of voltage enable flags. The voltage power-good register temporarily stores the second power-good signals as a plurality of second power-good flags. The component power-good register temporarily stores the third power-good signals as a plurality of third power-good flags. The judgment unit judges whether the computer system is in a start-up mode or a run-time mode according to the voltage enable flags and the second power-good flags. If the computer system is in the run-time mode, when the specific third power-good signal is converted from enabled to disabled, the judgment unit searches a delay time table according to the component corresponding to the specific third power-good signal, so as to obtain the tolerance period corresponding to the component. Then, after finishing counting the tolerance period, the judgment unit converts the first power-good signal corresponding to the specific third power-good signal from enabled to disabled.

In an embodiment of the present invention, when all the voltage enable flags and the second power-good flags are enable, it indicates that the computer system is in the run-time mode.

In an embodiment of the present invention, when it is detected in the run-time mode that one of the first power-good signals is converted from enabled to disabled, the power sequence module performs a forced protection action, for example, a system shut-down action, a system restart-up action, or a system locking protection action.

In an embodiment of the present invention, the voltage supply unit includes an auxiliary voltage regulator unit and a main voltage regulator unit. The auxiliary voltage regulator unit and the main voltage regulator unit include a plurality of voltage regulator modules. The voltage regulator modules respectively provide the corresponding power voltages according to the voltage enable signals. Moreover, after the power voltages have been output stably, the voltage regulator modules return the corresponding second power-good signals.

In another aspect, the present invention provides a method for controlling a power sequence of a computer system, which includes the following steps. A plurality of voltage enable signals is provided in turn according to a plurality of first power-good signals. A plurality of corresponding power voltages is provided in turn according to the voltage enable signals, and corresponding second power-good signals are returned after the power voltages are output stably, in which components in the computer system also provide a plurality of third power-good signals after the components receive the corresponding power voltages and are started successfully. A state recording module is provided to temporarily store the voltage enable signals, the second power-good signals, and the third power-good signals. The corresponding first power-good signals are provided according to the second power-good signals and the third power-good signals. In particular, when one of the third power-good signals is converted from enabled to disabled, a tolerance period is judged according to the component corresponding to the third power-good signal, and the first power-good signal corresponding to the specific third power-good signal is converted from enabled to disabled after the tolerance period is delayed. For other implementation details of the method for controlling a power sequence, reference can be made to the above description, which will not be described herein again.

Based on the above, the embodiments of the present invention are changed from the power sequence module directly making judgment of a forced protection action originally to using the state recording module to temporarily store required relevant information and creating in the state recording module a table of delay time tolerable for various components. In this way, after a transient power error occurs in some components, the state recording module first delays the tolerance period, and if the components have recovered by themselves in the tolerance period, it is not necessary to inform the power sequence module of performing a forced protection action (for example, forced shut-down, restart-up, or system locking), thereby reducing the occurrence probability of the forced protection action.

In order to make the aforementioned features and advantages of the present invention comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
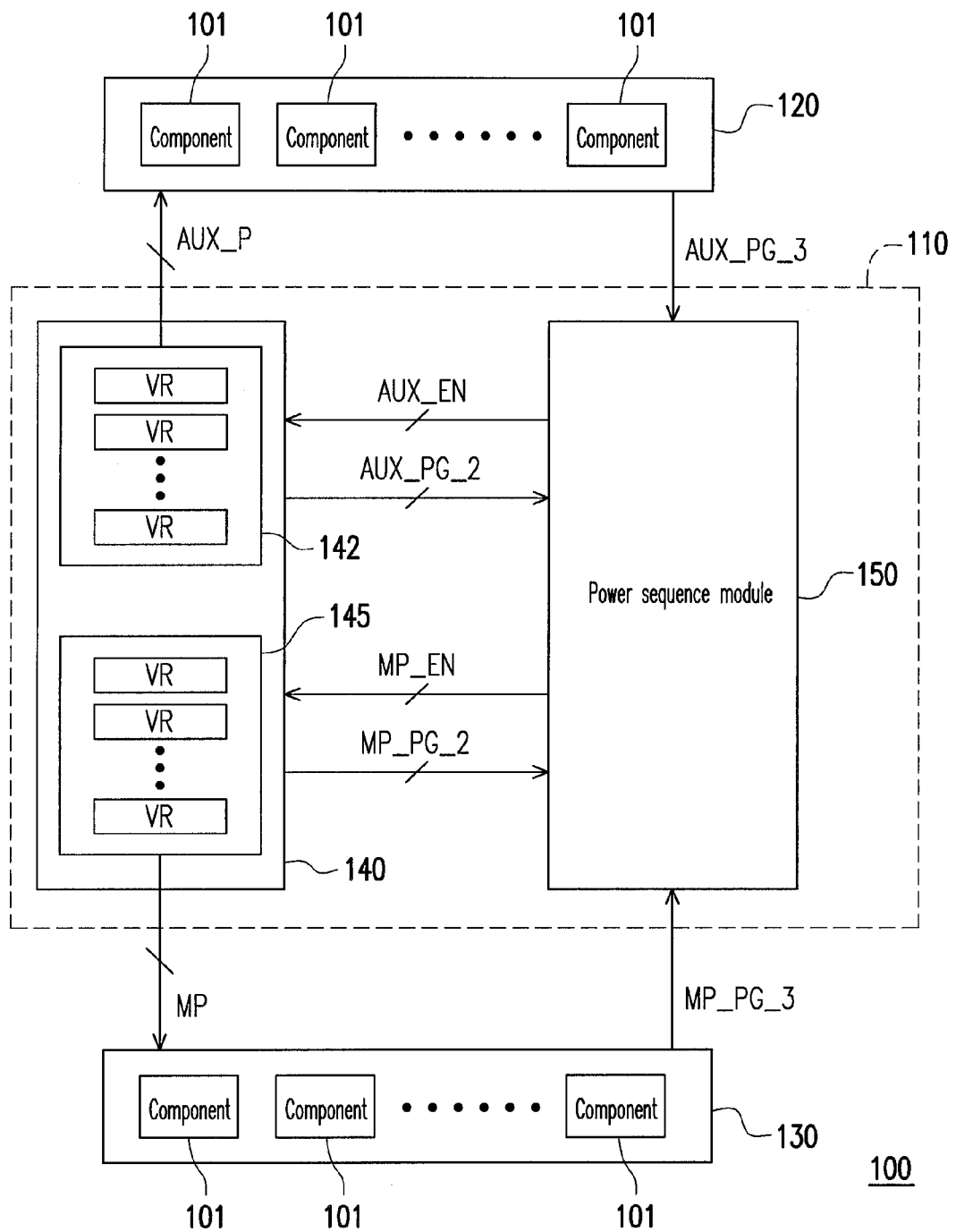
FIG. 1 is a block diagram of a power supply apparatus of a computer system.

Reference will now be made in detail to the present embodiments of the invention, examples of which are illustrated in the accompanying drawings. Wherever possible, the same reference numbers are used in the drawings and the description to refer to the same or like parts.

FIG. 1 is a block diagram of a power supply apparatus 110 of a computer system 100. In this embodiment, the power supply apparatus 110 may supply auxiliary power AUX_P and main power MP to a plurality of components 101 of the computer system 100, thereby maintaining the operation of the computer system 100. In this embodiment, the components 101 and the power supply apparatus 110 are, but not limited to, constituent circuits and members on a motherboard of the computer system 100. The power supply apparatus 110 may also provide power for components 101 other than the motherboard of the computer system 100.

Existing computer systems are all designed with the relevant technology of power sequence in start-up with the purpose of starting power voltages of the computer system 100 from high-level power voltages to low-level power voltages gradually. That is to say, only when the power voltage provided at this level is already stable and the component 101 receiving the power voltage is already started successfully, a power voltage of a lower level is provided, thereby achieving the effect of protecting the computer system 100.

Taking FIG. 1 as an example herein, the power supply apparatus 110 in this embodiment may supply auxiliary power AUX_P and main power MP to a plurality of components 101 of the computer system 100. This method can reduce current leakage when the computer system does not enter a run-time mode and is still in a standby mode before a start-up mode so as to reduce unnecessary power consumption. The standby mode mentioned here is a time period in which after the computer system 100 is connected to power, the auxiliary power of the computer system 100 will be started successively and a power button waits to be pressed by a user to start up the computer system 100 after the auxiliary power is completely started.

For ease of describing the following embodiments, the components 101 herein are divided into two parts. The first part is an auxiliary component group 120 receiving the auxiliary power AUX_P for operation, and the components 101 in the auxiliary component group 120 are, for example, a chipset, a baseboard management controller (BMC), and so on. The second part is a main component group 130 receiving the main power MP for operation, and the components 101 in the main component group 130 are, for example, a CPU, a random access memory, a hard disk, a chipset, a BMC, and so on. Some components 101 (for example, the chipset and the BMC) can operate for different functions in the start-up mode (receiving the auxiliary power AUX_P) or the run-time mode (receiving the main power MP) of the computer system due to their different functions and purposes.

Referring to FIG. 1, the power supply apparatus 110 includes a voltage supply unit 140 and a power sequence module 150. The voltage supply unit 140 includes an auxiliary voltage regulator unit 142 and a main voltage regulator unit 145. The auxiliary voltage regulator unit 142 and the main voltage regulator unit 145 respectively include a plurality of voltage regulator modules VR for providing auxiliary power AUX_P and main power MP of different voltage levels to the auxiliary component group 120 and the main component group 130 respectively. In this embodiment, voltage levels of the auxiliary power AUX_P include 12 V, 5 V, 3.3 V, 1.5 V, 1.25 V, and 1.1 V, while voltage levels of the main power MP may include 12 V, 6.5 V, 5 V, 3.3 V, 1.5 V, 1.1V, and so on, and the present invention is not limited to this. In addition, the power sequence module 150 of this embodiment may be implemented using a complex programmable logic device (CPLD) in this embodiment.

In this embodiment, when the computer system 100 is connected to mains (for example, alternating current power of 110V) or a battery is installed in a notebook computer to enter a standby mode, an external circuit for managing power on the motherboard first starts the voltage regulator modules VR in the auxiliary voltage regulator unit 142 in turn in a simple power sequence, for example, starts voltage regulator modules VR of 12 V, 5 V, and 3.3 V in turn.

Afterwards, since the power sequence module 150 of this embodiment receives the 3.3 V auxiliary power voltage in the auxiliary voltage regulator unit 142 and is started, after the auxiliary voltage regulator module VR of 3.3 V is started, the power sequence module 150 is accordingly started and continues to manage the following power sequence. For example, the power sequence module 150 then sends an auxiliary power enable signal AUX_EN of 1.5 V to start the voltage regulator module VR of 1.5 V in the auxiliary voltage regulator unit 142. The voltage regulator module VR provides an auxiliary power power-good signal AUX_PG_2 (also referred to as a second power-good signal) of 1.5V to the power sequence module 150 after the output level of 1.5 V is already stable.

The component 101 receiving 1.5 V in the auxiliary component group 120 also provides an auxiliary component power-good signal AUX_PG_3 (also referred to as a third power-good signal) to the power sequence module 150 after the component 101 has been started successfully. The power sequence module 150 continues to emit an auxiliary power enable signal AUX_EN of a lower level (for example, 1.25 V) only after receiving the auxiliary power power-good signal AUX_PG_2 of 1.5 V and the auxiliary component power-good signal AUX_PG_3 of the component 101 corresponding to 1.5 V, so as to start all the auxiliary power AUX_P gradually.

After the auxiliary power AUX_P is completely started, the power sequence module 150 waits for the user to start the computer system 100 by pressing the power button or other methods. When the user presses the power button to start the computer system 100, the computer system 100 enters the start-up mode, and the power sequence module 150 provides main voltage enable signals MP_EN of the voltage regulator modules VR of different voltage levels in turn according to main power power-good signals MP_PG_2 as described in the above embodiment.

For example, after providing a main voltage enable signal MP_EN of a voltage level of 12 V, the power sequence module 150 continuously judges whether a main power power-good signal MP_PG_2 and a main component power-good signal MP_PG_3 of this voltage level (12 V) are enabled, and after detecting that the signals have been enabled, provides a main power enable signal MP_EN of a lower voltage level (for example, 6.5 V) to the voltage regulator module VR of 6.5 V in the main voltage regulator unit 145, and so forth, until all the main power MP is completely started, thereby completing the start-up mode of the computer system 100 and enabling the computer system 100 to enter the run-time mode to perform an action such as initialization of an operating system.

In addition, in the run-time mode of the computer system 100, the power sequence module 150 still continuously monitors the auxiliary component power-good signals AUX_PG_3 and the main component power-good signals MP_PG_3 provided by the auxiliary component group 120 and the main component group 130. In this way, when a power error occurs in some components 101 of the computer system 100, for example, when one of the main component power-good signals MP_PG_3 is converted from enabled to disabled, the power sequence module 150 may immediately perform a relevant forced protection action to protect the component 101 in the computer system 100 from being damaged. The forced protection action mentioned here is, for example, forced shut-down, restart-up, or even locking of the computer system 100, and may also be other kinds of system protection measures. This embodiment is not limited to this.

However, in most cases, the user does not access and use all the components 101 in the computer system 100 at the same time when using the computer system 100. If a transient power error occurs in some components 101 suddenly, that is, these components 101 return to normal right away after the power error occurs, but the power sequence module 150 already judges that the power error occurs in the components 101 so that a system protection action such as forced shut-down is performed on the computer system 100, the user's use of the computer system 100 may be interrupted forcibly.

If the above components in which the transient power error occurs are main components in the computer system 100, for example, a CPU, a memory, a south bridge chip, a north bridge chip, or a chipset, forced restart or shut-down undoubtedly must be performed on the computer system 100. However, if some components 101 in which the transient power error occurs do not affect the entire operation of the computer system 100, but the computer system 100 is still set to be shut down forcibly, huge loss is frequently incurred to users or manufacturers.

Herein, the spirit of the present invention is to use the state recording module in the embodiment of the present invention to temporarily store all voltage states (for example, voltage enable signals and various power-good signals) so as to judge the mode of the computer system at this time, and use the "indirect waiting and judging" method in the embodiment of the present invention to wait for and judge various signals in the run-time mode of the computer system 100 in place of the original approach of "directly waiting for and judging" various signals. In addition, in the embodiment of the present invention, a table of delay time tolerable for various components is created, so as decide the tolerance period of each component depending on importance and operating characteristics thereof, thereby reducing the occurrence probability of taking a forced protection measure on the computer system.

Figure 2:
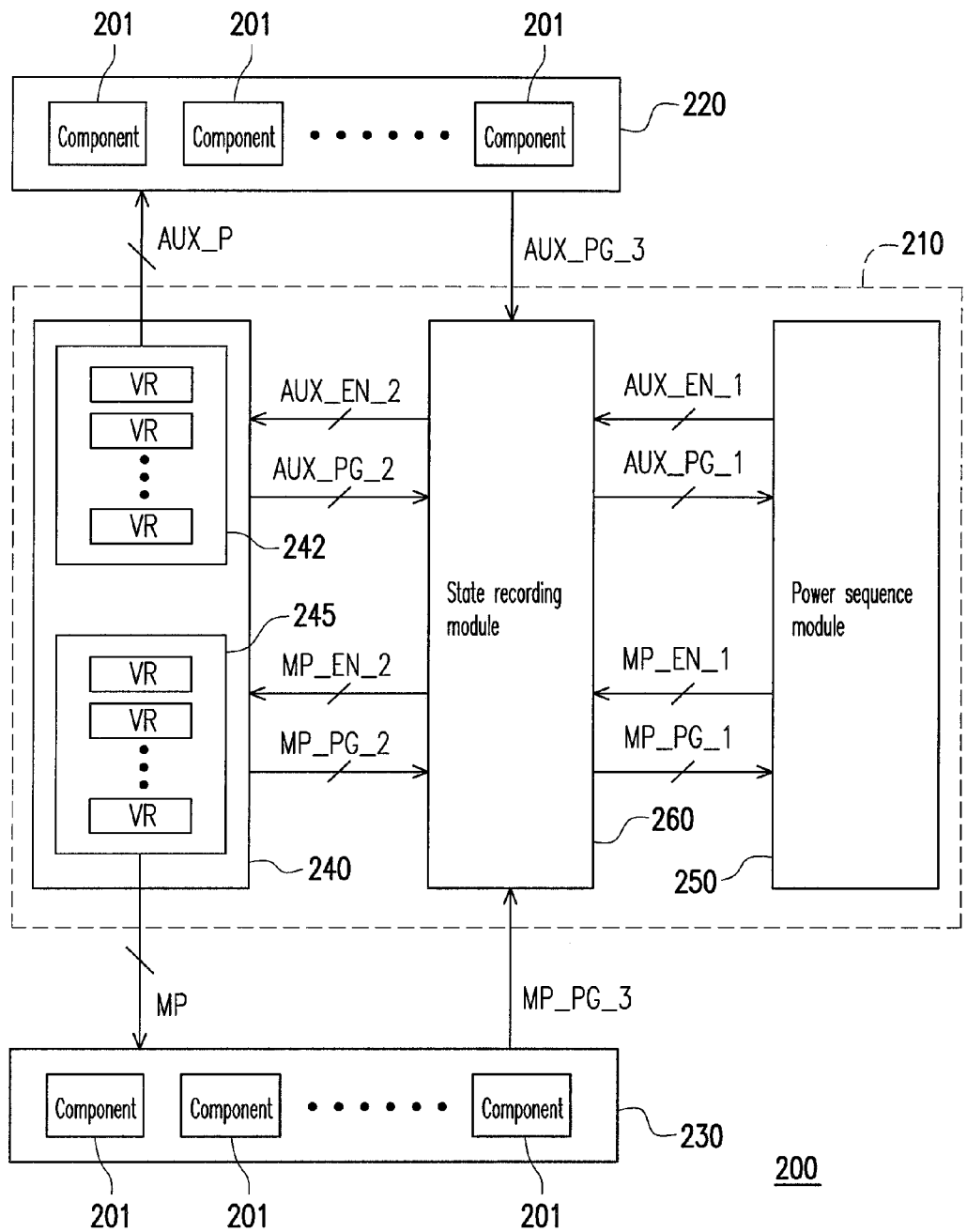
FIG. 2 is a block diagram of a power supply apparatus of a computer system according to an embodiment of the present invention.
Figure 3:
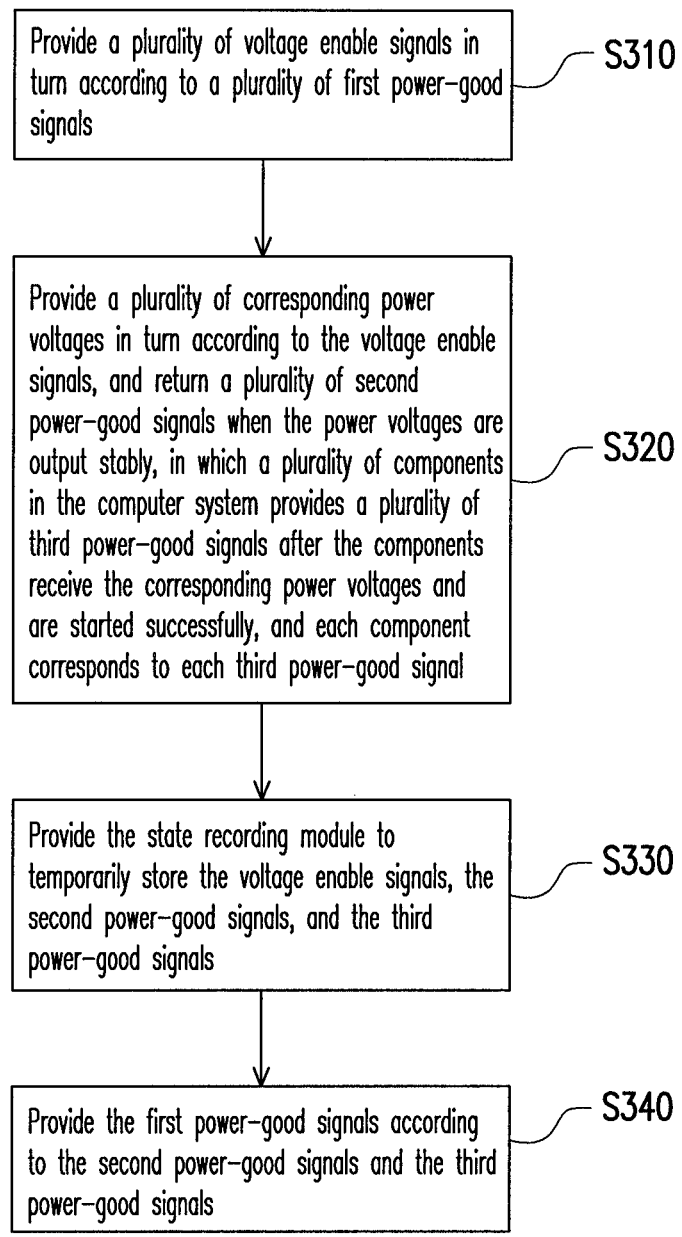
FIG. 3 is a flow chart of a method for controlling a power sequence of a computer system according to an embodiment of the present invention.

The spirit of the present invention is implemented through an embodiment below. FIG. 2 is a block diagram of a power supply apparatus 210 of a computer system 200 according to an embodiment of the present invention, and FIG. 3 is a flow chart of a method for controlling a power sequence of the computer system 200 according to an embodiment of the present invention. The power supply apparatus 210 in the embodiment of the present invention can supply auxiliary power AUX_P and main power MP to a plurality of components 201 in the computer system 200, thereby maintaining the operation of the computer system 200. The plurality of components 201 in the computer system 200 may be divided into an auxiliary component group 220 and a main component group 230. Referring to FIG. 2, the power supply apparatus 210 of the computer system 200 includes a power sequence module 250, a voltage supply unit 240, and a state recording module 260, and the voltage supply unit 240 also includes an auxiliary voltage regulator unit 242 and a main voltage regulator unit 245. The power sequence module 250 and the state recording module 260 of this embodiment may be implemented using a CPLD. The functional structures and operation steps of some of the components are similar to those in the above embodiment, so the same parts will not be described herein.

For ease of comprehension of persons skilled in the art, this embodiment is described below according to the members in blocks in FIG. 2 in combination with the operation flow of FIG. 3. In Step S310, the power sequence module 250 provides a plurality of voltage enable signals (for example, an auxiliary power enable signal AUX_EN_1 and a main power enable signal MP_EN_1) in turn according to first power-good signals (for example, an auxiliary power power-good signal AUX_PG_1 and a main power power-good signal MP_PG_1). In this embodiment, the power sequence module 250 provides auxiliary power enable signals AUX_EN_1 corresponding to the auxiliary power AUX_P of different voltage levels in turn in a standby mode of the computer system 200, and provides main power enable signals MP_EN_1 corresponding to the main power MP of different voltage levels in a start-up mode of the computer system.

In Step S320, the voltage supply unit 240 provides power voltages of corresponding levels in turn according to the voltage enable signals (the auxiliary power enable signal AUX_EN_1 and the main power enable signal MP_EN_1), and returns a plurality of second power-good signals (for example, an auxiliary power power-good signal AUX_PG_2 and a main power power-good signal MP_PG_2) when the power voltages are output stably. The plurality of components 201 in the computer system 200 provides a plurality of third power-good signals (for example, an auxiliary component power-good signal AUX_PG_3 and a main component power-good signal MP_PG_3) after the components 201 receive the corresponding power voltages and are started successfully. In addition, each component 201 corresponds to each third power-good signal, and the state recording module 260 may obtain the corresponding component 201 according to each third power-good signal.

Still referring to FIGS. 2 and 3, in Step S330, the state recording module 260 coupled to the power sequence module 250 and the voltage supply unit 240 is provided, and the state recording module 260 is used for temporarily storing the voltage enable signals (the auxiliary power enable signal AUX_EN_1 and the main power enable signal MP_EN_1), the second power-good signals (the auxiliary power power-good signal AUX_PG_2 and the main power power-good signal MP_PG_2), and the third power-good signals (the auxiliary power power-good signal AUX_PG_3 and the main power power-good signal MP_PG_3). In this way, in Step S340, the state recording module 260 can provide the first power-good signals (the auxiliary power power-good signal AUX_PG_1 and the main power power-good signal MP_PG_1) according to the second power-good signals and the third power-good signals.

Figure 4:
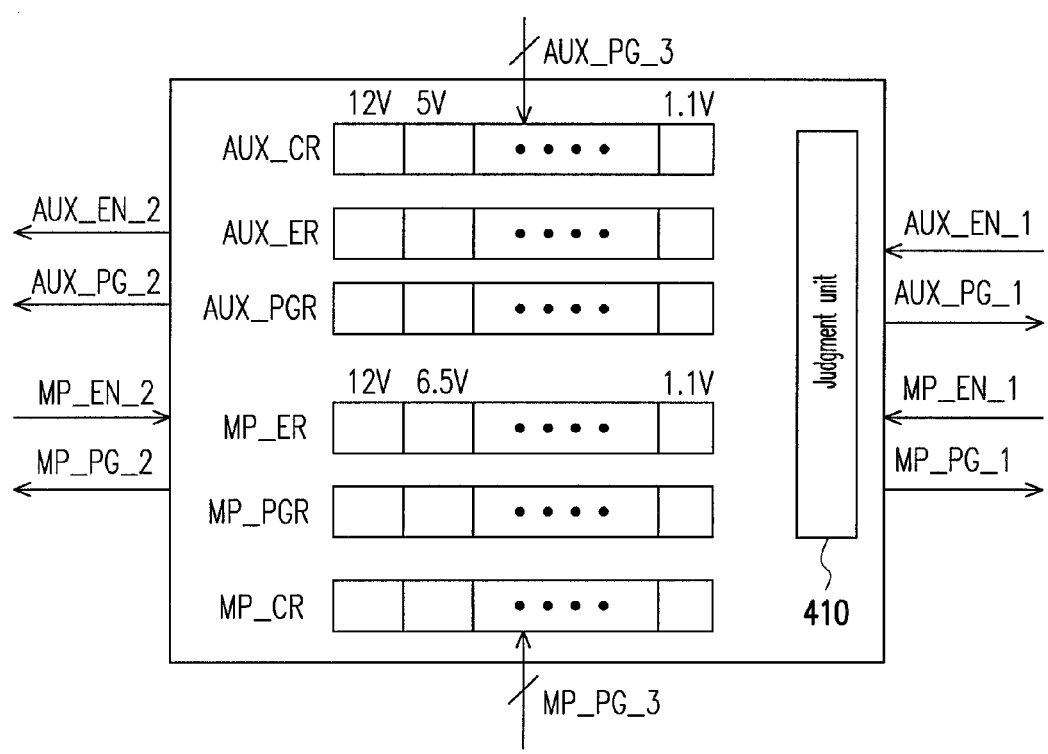
FIG. 4 is a functional block diagram of a state recording module in FIG. 2.

The functional architecture of the state recording module 260 is described in detail herein. FIG. 4 is a functional block diagram of the state recording module 260 in FIG. 2. The state recording module 260 includes a voltage enable register, a voltage power-good register, a component power-good register, and a judgment unit 410.

Since the voltage supply unit 240 in FIG. 2 provides two parts of power including the auxiliary power AUX_P and the main power MP, in this embodiment, the voltage enable register is divided into an auxiliary voltage enable register AUX_ER and a main voltage enable register MP_ER in FIG. 4, the voltage power-good register is divided into an auxiliary voltage power-good register AUX_PGR and a main voltage power-good register MP_PGR in FIG. 4, and the component power-good register is divided into an auxiliary component power-good register AUX_CR and a main component power-good register MP_CR in FIG. 4.

Therefore, the auxiliary voltage enable register AUX_ER and the main voltage enable register MP_ER respectively temporarily store the auxiliary voltage enable signal AUX_EN_1 and the main voltage enable signal MP_EN_1 (in other words, the voltage enable signals) as a plurality of voltage enable flags EN_T, and respectively convert them into an auxiliary voltage enable signal AUX_EN_2 and a main voltage enable signal MP_EN_2 and provide them to the voltage supply unit 240.

The auxiliary voltage power-good register AUX_PGR and the main voltage power-good register MP_PGR respectively temporarily store the auxiliary voltage power-good signal AUX_PG_2 and the main voltage power-good signal MP_PG_2 (in other words, the second power-good signals) as a plurality of second power-good flags PG2_T. The auxiliary component power-good register AUX_CR and the main component power-good register MP_CR temporarily store the auxiliary component power-good signal AUX_PG_3 and the main component power-good signal MP_PG_3 (in other words, the third power-good signals) as a plurality of third power-good flags PG3_T. In this way, the judgment unit 410 can provide the auxiliary voltage power-good signal AUX_PG_1 and the main voltage power-good signal MP_PG_1 to the power sequence module 250 respectively according to the second power-good flags PG2_T and the third power-good flags PG3_T.

For ease of describing the relationship between a temporarily stored flag and a signal, in this embodiment, when the signal is enabled, the corresponding stored flag is recorded as "1", and when the signal is disabled, the corresponding stored flag is recorded as "0", thereby representing the state of each signal. However, the embodiment of the present invention is not limited to this, and persons skilled in the art may also set signal enabling as a flag "0" and set signal disabling as a flag "1".

Figure 5:
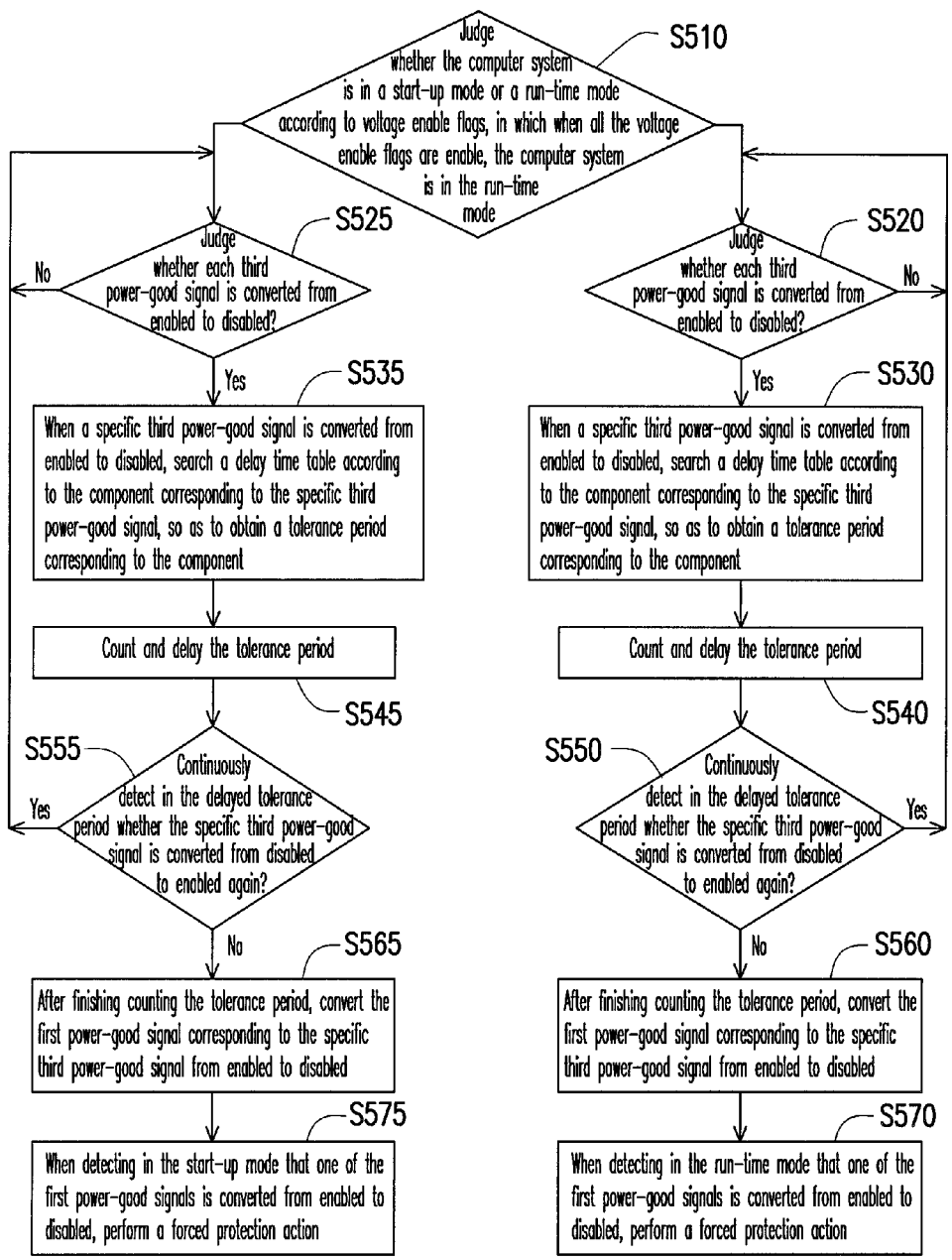
FIG. 5 is a detailed flow chart of Step S340 in FIG. 3.

In this way, the judgment unit 410 in the state recording module 260 can provide the first power-good signals according to the second power-good signals and the third power-good signals. FIG. 5 is a detailed flow chart of Step S340 in FIG. 3. This embodiment is described with reference to the functional architecture of the state recording module 260 in FIG. 4 in combination with the flow chart of FIG. 5.

In Step S510, the judgment unit 410 may use voltage enable flags EN_T to judge whether the computer system is in a start-up mode or a run-time mode. In particular, if the computer system 200 is in the start-up mode, it indicates that main voltage enable signals MP_EN_1 of some voltage levels are still not enabled yet, and thus voltage enable flags EN_T corresponding to the main voltage enable signals MP_EN_1 can be used for judgment. In some embodiments, the judgment unit 410 may also use a combination of voltage enable flags EN_T corresponding to main voltage enable signals MP_EN_1 and second power-good flags PG2_T corresponding to main power power-good signals MP_PG_2 to judge the mode of the computer system. In other words, in the case that main voltage enable signals MP_EN_1 of some voltage levels are not enabled yet, some of main power power-good signals MP_PG_2 are also not enabled yet, and thus the mode of the computer system can be judged as above.

For example, when a main power power-good signal MP_PG_2 corresponding to 6.5 V in the power supply apparatus 210 is suddenly converted from enabled to disabled, or the two signals are not enabled yet, it can be judged by the state recording module 260 whether the computer system is in the start-up mode or the run-time mode at this time. At this time, it can be found in the voltage enable flags EN_T of the state recording module 260 that flags corresponding to main power enable signals MP_EN_1 of lower than 6.5 V (for example, 5 V, 3.3 V, 1.5 V, and so on) are all "0", indicating that the start-up mode is not completed yet, and thus it can be determined that the computer system 200 is in the start-up mode. In another aspect, when it is found that the voltage enable flags EN_T corresponding to the main power enable signals MP_EN_1 are all "1" (enable), it indicates that the computer system 200 has been started up and is in the run-time mode.

Still referring to FIGS. 4 and 5, the computer system 200 being in the run-time mode is taken as an example here. When the computer system 200 is in the run-time mode, the process proceeds from Step S510 to Step S520 to judge whether the third power-good signal (that is, the auxiliary component power-good signal AUX_PG_3 or the main component power-good signal MP_PG_3) of each voltage level is converted from enabled to disabled. If one of the third power-good signals is converted from enabled to disabled (here, the signal converted from enabled to disabled is referred to as a specific third power-good signal), the process proceeds to Step S530, in which the judgment unit 410 searches a delay time table according to the component 201 corresponding to the specific third power-good signal, so as to obtain a tolerance period corresponding to the component 201.

The delay time table of the judgment unit 410 is described herein. Since each third power-good signal corresponds to a component 201, in the embodiment of the present invention, the components 201 are numbered with codes and transient error delay time (also referred to as a tolerance period in this embodiment) tolerable for each component is appropriately set. In addition, due to the flags and signal states temporarily stored by the state recording module 260, different tolerance periods may be set according to that the computer system 200 is in the start-up mode or the run-time mode respectively.

For example, the tolerance period of important components 201 must be set to 0 ms, the function of which is equivalent to that the power sequence module 250 directly makes judgment of a forced protection action so as to achieve the effect of real-time response, and setting for this part is usually applied to main key components such as the CPU, the memory, and the chipset without any slight error. However, peripheral components 201, for example, an NDC card, a Riser card, and so on, if returning to normal immediately after a transient power error occurs, may not affect the operation of the computer system 200. Therefore, the tolerance period of these components 201 may be set to 100 ms. For parameter adjustment between the tolerance periods and the components 201, corresponding data may be obtained from experience acquired after long-term operation of the computer system 200, complex judgment is made according to documents of standard specifications, and then flexible adjustment is performed to obtain an optimum value. In this way, in this embodiment, the delay time table in the state recording module 260 can be modified by being downloaded to the CPLD again through a program, thereby enhancing the efficiency of making improvement. The following Table (1) is an example of the delay time table in the embodiment of the present invention, based on which persons skilled in the art can make extension, and thus the present invention is not limited to this. The tolerance period T1 represents a tolerance period of the component 201 in the start-up mode, and the tolerance period T2 represents a tolerance period of the component 201 in the run-time mode.

TABLE (1)

| Component 201 | Code number | Tolerance period T1 | Tolerance period T2 |
|---|---|---|---|
| CPU | 000000 | 0 ms | 0 ms |
| Memory | 000001 | 0 ms | 0 ms |
| Chipset | 000010 | 0 ms | 0 ms |
| NDC card | 000011 | 100 ms | 100 ms |
| Rider card | 000100 | 100 ms | 100 ms |
| ... | ... | ... | ... |

Referring back to FIG. 5, in Step S540, the state recording module 260 counts and delays the tolerance period T2 corresponding to the component 201, and in Step S550, continuously detects in the delayed tolerance period T2 whether the specific third power-good signal is converted from disabled to enabled again. When it is detected that the specific third power-good signal is converted from disabled to enabled again in the tolerance period T2, it indicates that the specific third power-good signal already returns to normal after a short time, and thus the process returns from Step S550 to Step S520 to re judge whether any other third power-good signal is converted from enabled to disabled.

After finishing counting the tolerance period T2, the process proceeds to Step S560, in which since the component 201 does not recover in the tolerance period T2, the state recording module 260 converts the main power power-good signal MP_PG_1 (that is, the first power-good signal) of the voltage level corresponding to the specific third power-good signal from enabled to disabled, thereby informing the power sequence module 250. In this way, in Step S570, when the power sequence module 250 in FIG. 2 detects in the run-time mode of the computer system 200 that the main power power-good signal MP_PG_1 of the first power-good signal is converted from enabled to disabled, the power sequence module 250 controls the computer system 200 to perform a forced protection action.

In another aspect, the operation flows of Steps S525, S535, S545, S555, S565, and S575 when the computer system 200 in the start-up mode are similar to those of Steps S520, S530, S540, S550, S560, and S570 when the computer system 200 is in the run-time mode, so the same parts are not described. The difference lies in that: the tolerance period in Steps S535-S555 should be the tolerance period T1 listed in Table (1). In addition, in Step S575, the forced protection action performed in the start-up mode may be different from the forced protection action in the run-time mode, and persons applying this embodiment may make adjustment according to design requirements.

In view of the above, the power supply apparatus 210 in the embodiments of the present invention contributes to the condition and flexibility of judging the power voltage in the method for controlling a power sequence and can improve the stability of the computer system 200, and is applicable in the circumstances where the computer system 200 is in a power supply region with unstable voltage or a transient power error easily occurs in some components 201 in the computer system 200. In addition, if the function is implemented by a CPLD, the cost of the computer system 200 can also be reduced.

To sum up, the embodiments of the present invention are changed from the power sequence module directly making judgment of a forced protection action originally to using the state recording module to temporarily store required relevant information and creating in the state recording module a table of delay time tolerable for various components. In this way, after a transient power error occurs in some components (for example, components other than the CPU and the chipset), the state recording module first delays the power error signal by a tolerance period, and if the components have recovered by themselves in the tolerance period, it is not necessary to inform the power sequence module of performing a forced protection action (for example, forced shut-down, restart-up, or system locking), thereby reducing the occurrence probability of the forced protection action.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A power supply apparatus of a computer system, comprising:
   a power sequence module, for providing a plurality of voltage enable signals in turn according to a plurality of first power-good signals;
   a voltage supply unit, for providing a plurality of corresponding power voltages in turn according to the voltage enable signals, and returning a plurality of second power-good signals when the power voltages are output stably, wherein a plurality of components in the computer system provides a plurality of third power-good signals after the components receive the corresponding power voltages and are started successfully, and each component corresponds to each third power-good signal; and
   a state recording module, coupled to the power sequence module and the voltage supply unit, for temporarily storing the voltage enable signals, the second power-good signals, and the third power-good signals, and providing the first power-good signals according to the second power-good signals and the third power-good signals, wherein
   when a specific third power-good signal is converted from enabled to disabled, the state recording module judges a tolerance period according to the component corresponding to the specific third power-good signal, and converts one of the first power-good signals corresponding to the specific third power-good signal from enabled to disabled after the tolerance period is delayed, and the specific third power-good signal is one of the third power-good signals.

2. The power supply apparatus of a computer system according to claim 1, wherein when the state recording module detects in the tolerance period that the specific third power-good signal is converted from disabled to enabled again, the state recording module maintains one of the first power-good signals corresponding to the specific third power-good signal.

3. The power supply apparatus of a computer system according to claim 1, wherein the state recording module comprises:
   a voltage enable register, for temporarily storing the voltage enable signals as a plurality of voltage enable flags;
   a voltage power-good register, for temporarily storing the second power-good signals as a plurality of second power-good flags;
   a component power-good register, for temporarily storing the third power-good signals as a plurality of third power-good flags; and
   a judgment unit, for judging whether the computer system is in a start-up mode or a run-time mode according to the voltage enable flags and the second power-good flags, in the run-time mode, when the specific third power-good signal is converted from enabled to disabled, searching a delay time table according to the component corresponding to the specific third power-good signal, so as to obtain the tolerance period corresponding to the component, and after finishing counting the tolerance period, converting one of the first power-good signals corresponding to the specific third power-good signal from enabled to disabled.

4. The power supply apparatus of a computer system according to claim 3, wherein when all the voltage enable flags and the second power-good flags are enable, the computer system is in the run-time mode.

5. The power supply apparatus of a computer system according to claim 3, wherein when it is detected in the run-time mode that one of the first power-good signals is converted from enabled to disabled, the power sequence module performs a forced protection action.

6. The power supply apparatus of a computer system according to claim 5, wherein the forced protection action is a system shut-down action, a system restart-up action, or a system locking protection action.

7. The power supply apparatus of a computer system according to claim 3, wherein the voltage enable register comprises an auxiliary voltage enable register and a main voltage enable register, the voltage power-good register comprises an auxiliary voltage power-good register and a main voltage power-good register, and the component power-good register comprises an auxiliary component power-good register and a main component power-good register.

8. The power supply apparatus of a computer system according to claim 1, wherein the voltage supply unit comprises an auxiliary voltage regulator unit and a main voltage regulator unit, the auxiliary voltage regulator unit and the main voltage regulator unit respectively comprise a plurality of voltage regulator modules, and the voltage regulator modules respectively provide the power voltages according to the corresponding voltage enable signals and return the second power-good signals when the power voltages are output stably.

9. A method for controlling a power sequence of a computer system, comprising:

providing a plurality of voltage enable signals in turn according to a plurality of first power-good signals;

providing a plurality of corresponding power voltages in turn according to the voltage enable signals, and returning a plurality of second power-good signals when the power voltages are output stably, wherein a plurality of components in the computer system provides a plurality of third power-good signals after the components receive the corresponding power voltages and are started, and each component corresponds to each third power-good signal;

providing a state recording module to temporarily store the voltage enable signals, the second power-good signals, and the third power-good signals; and providing the first power-good signals according to the second power-good signals and the third power-good signals, wherein when a specific third power-good signal is converted from enabled to disabled, a tolerance period is judged according to the component corresponding to the specific third power-good signal, and one of the first power-good signals corresponding to the specific third power-good signal is converted from enabled to disabled after the tolerance period is delayed, and the specific third power-good signal is one of the third power-good signals.

10. The method for controlling a power sequence of a computer system according to claim 9, wherein the step of providing the first power-good signals according to the second power-good signals and the third power-good signals further comprises:

maintaining one of the first power-good signals corresponding to the specific third power-good signal when it is detected in the tolerance period that the specific third power-good signal is converted from disabled to enabled again.

11. The method for controlling a power sequence of a computer system according to claim 9, further comprising:

judging whether the computer system is in a start-up mode or a run-time mode according to the voltage enable flags, wherein when all the voltage enable flags are enable, the computer system is in the run-time mode.

12. The method for controlling a power sequence of a computer system according to claim 11, further comprising:

performing a forced protection action when it is detected in the run-time mode that one of the first power-good signals is converted from enabled to disabled.

13. The method for controlling a power sequence of a computer system according to claim 9, wherein the step of providing the first power-good signals according to the second power-good signals and the third power-good signals further comprises:

judging whether the computer system is in a start-up mode or a run-time mode according to the voltage enable flags;

when the specific third power-good signal is converted from enabled to disabled, searching a delay time table according to the component corresponding to the specific third power-good signal, so as to obtain the tolerance period corresponding to the component;

counting and delaying the tolerance period; and after finishing counting the tolerance period, converting one of the first power-good signals corresponding to the specific third power-good signal from enabled to disabled.

* * * * *